United States Patent [19]

Glenn

[11] Patent Number: 5,484,030
[45] Date of Patent: Jan. 16, 1996

[54] INDEPENDENTLY-POWDERED BUMPER CART

[76] Inventor: John V. Glenn, 401 W. Main St., Heber Springs, Ark. 72543

[21] Appl. No.: 286,632

[22] Filed: Aug. 5, 1994

[51] Int. Cl.⁶ ............................. B62D 1/02; B60K 17/30
[52] U.S. Cl. ............................................. 180/6.2; 180/21
[58] Field of Search .................... 180/6.2, 6.24, 180/7, 20, 21, 22

[56] References Cited

U.S. PATENT DOCUMENTS

| | | | |
|---|---|---|---|
| 1,373,108 | 3/1921 | Stoehrer | 180/2.1 |
| 1,467,959 | 9/1923 | Stoehrer | 180/2.1 |
| 1,535,040 | 4/1925 | Riehl | 180/220 |
| 1,772,220 | 8/1930 | Markey | 180/2.1 |
| 1,839,981 | 1/1932 | Markey | 180/255 |
| 1,980,867 | 11/1934 | Lusse | 293/19 |
| 1,982,391 | 11/1934 | Markey | 180/2.1 |
| 3,404,746 | 10/1968 | Slay | 180/23 |
| 3,938,828 | 2/1976 | Hammond | 280/261 |
| 4,253,535 | 3/1981 | Kleine et al. | 180/6.24 |
| 4,324,301 | 4/1982 | Eyerly | 180/2.1 |
| 5,083,629 | 1/1992 | Chang | 180/6.2 |

OTHER PUBLICATIONS

Swish-err Riding Mower Manual, 1993, pp. 1, 2 & 10.

*Primary Examiner*—Mitchell J. Hill
*Attorney, Agent, or Firm*—Gary N. Speed

[57] ABSTRACT

A highly maneuverable bumper cart amusement vehicle is disclosed that is quite portable, uses a self-contained power supply and is designed to be operated on a plurality of surfaces without electrically-conductive flooring or a special track or facility.

7 Claims, 5 Drawing Sheets

INDEPENDENTLY-POWDERED BUMPER CART

CROSS-REFERENCES TO RELATED APPLICATIONS (IF ANY).

None

Statement as to rights to inventions made under federally sponsored research and development (if any).

None

BACKGROUND OF THE INVENTION

A. Field of Invention

The present invention relates to the field of motorized bumper carts used as amusement vehicles.

B. Description of the Related Art

Bumper cart-type amusement vehicles typically are electrically-powered vehicles that require a special electrically-conductive floor and a special electrically-conductive trolley electrode overhead. This design has restricted the portability of the vehicles and created a risk of electrical shock.

Go-carts have typically been four-wheel, rear-drive vehicles operated with gasoline engines. Go-cart designs are generally portable and can is operate on a variety of surfaces, but generally lack the ability to turn in a zero turning radius and are not intended or designed for the collisions from all directions like bumper carts.

One object of the present invention is to provide a highly maneuverable vehicle that does not require a special facility or surface (e.g., an electrically-conductive surface) for operation. Another object of the present invention is to combine the amusement attributes of a bumper car with the portability and simplicity of a go-cart that may be used on a plurality of surfaces. Another object of the present invention is to avoid the risk of electrical shock through the elimination of any need for outside electrical current to operate the vehicle. A further object is to provide a vehicle that will change directions immediately without having to veer into a new direction because the steering mechanism and the traction mechanism are separate and distinct.

These and other objects of the invention will be apparent to those skilled in this art from the following detailed description of a preferred embodiment of the invention.

BRIEF SUMMARY OF THE INVENTION

The present invention relates to a motorized bumper cart that can be used as an amusement vehicle on any flat surface without special flooring or electrical connections. It is designed to change directions immediately so as to be extremely maneuverable and enable the driver to dodge or bump into other similar vehicles and to twirl or spin as if driving on ice.

The cart is designed for safety as well as maneuverability by including a large, stable platform surrounded by shock-absorbing material. The platform should be wide enough to prevent the accidental mashing of fingers or hands in the event a driver extended a hand to avoid or soften a collision.

The central placement of the drive wheel enables a zero-turning radius for the vehicle.

The cart may be operated upon flat surfaces such as dirt, gravel, hard clay, asphalt, concrete or artificial surfaces. The cart may also be operated upon existing flooring surfaces for electrically-powered bumper carts, although the floor need not be electrically-conductive.

BRIEF DESCRIPTION OF THE DRAWINGS

The invention will be further described in connection with the accompanying drawings, in which.

REFERENCE NUMERALS IN DRAWINGS

Figure 1:
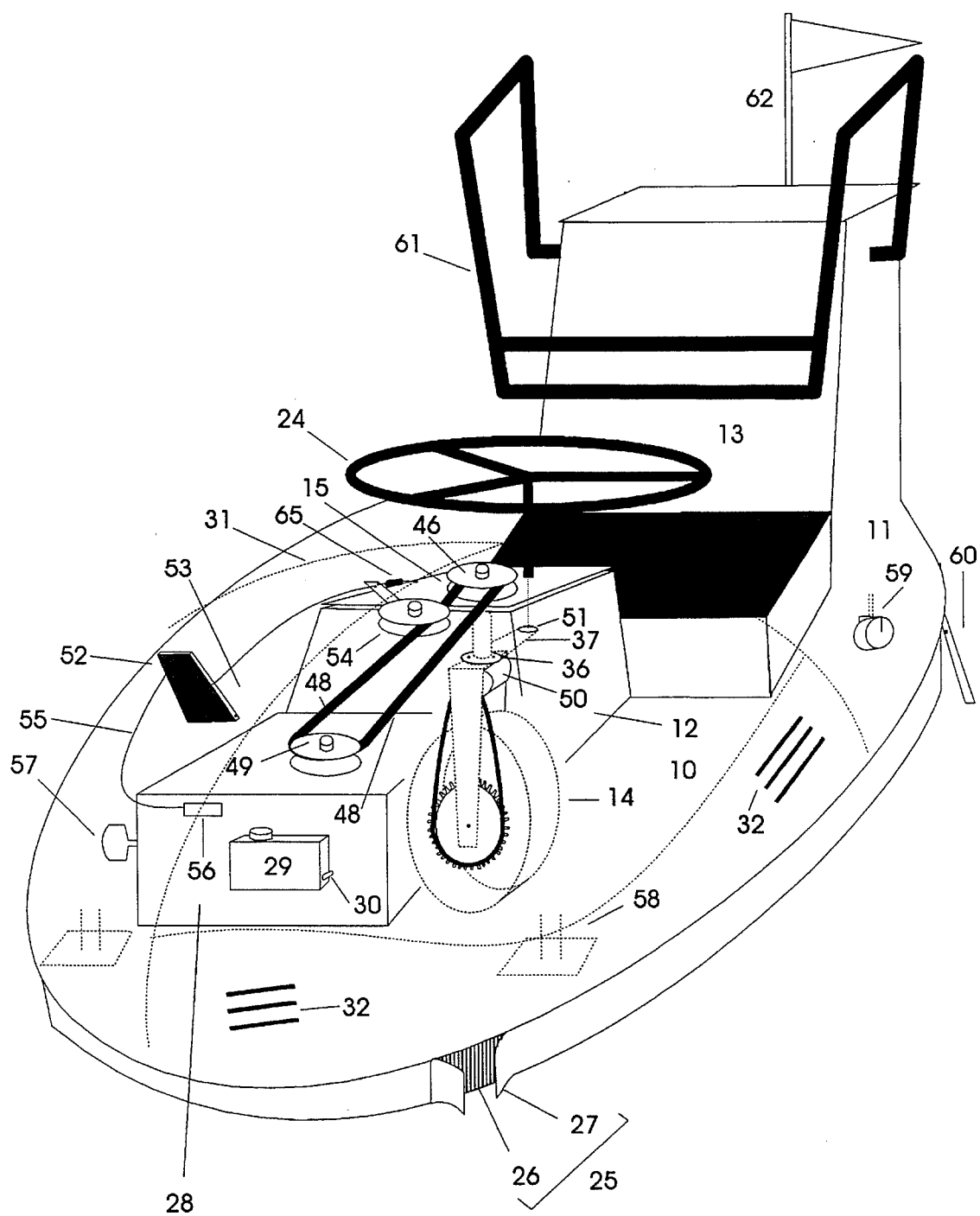
FIG. 1 is a perspective view of an independently-powered bumper cart in the preferred embodiment.
Figure 2:
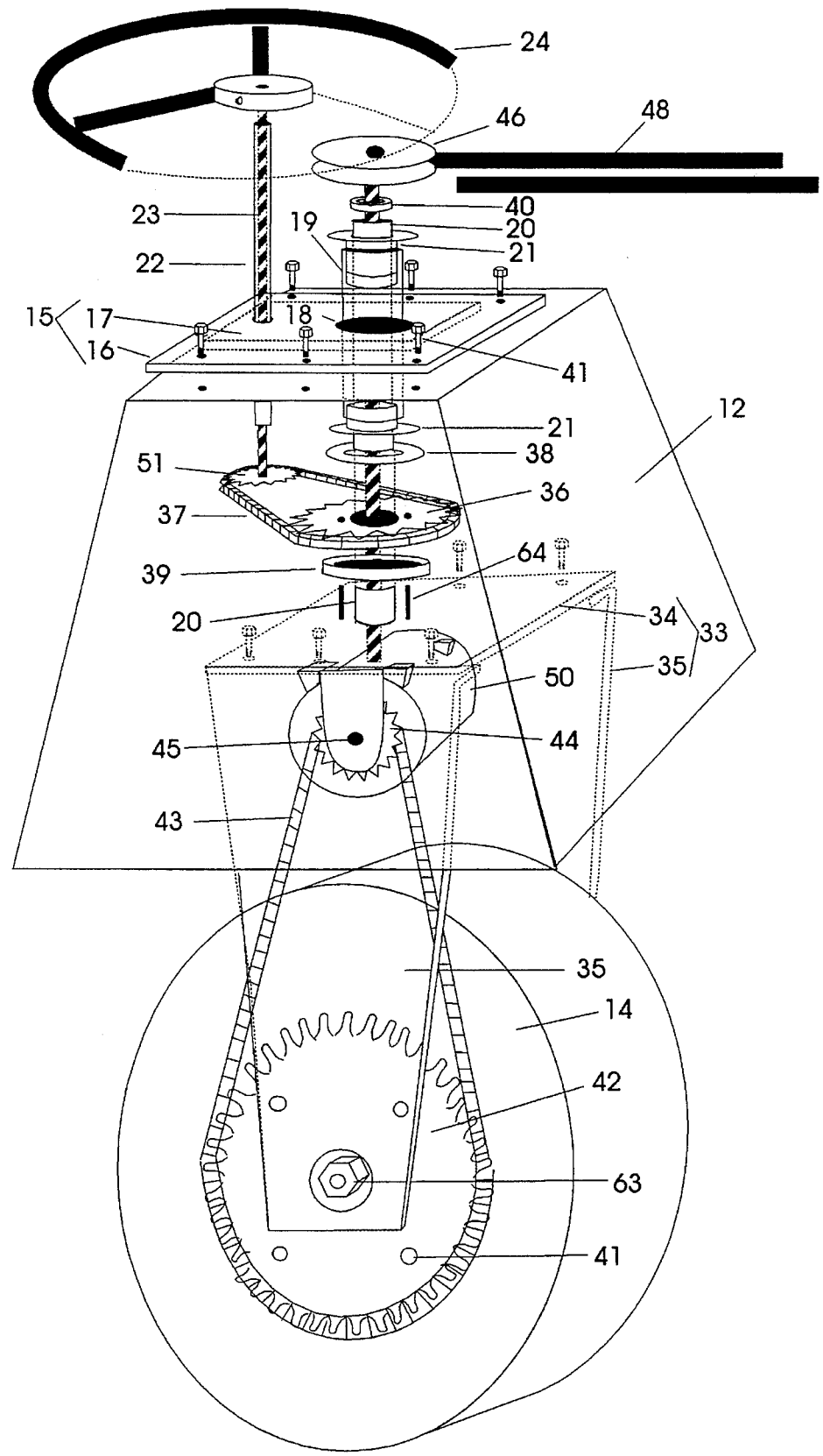
FIG. 2 is a perspective view of the drive wheel fork of the preferred embodiment.
Figure 3:
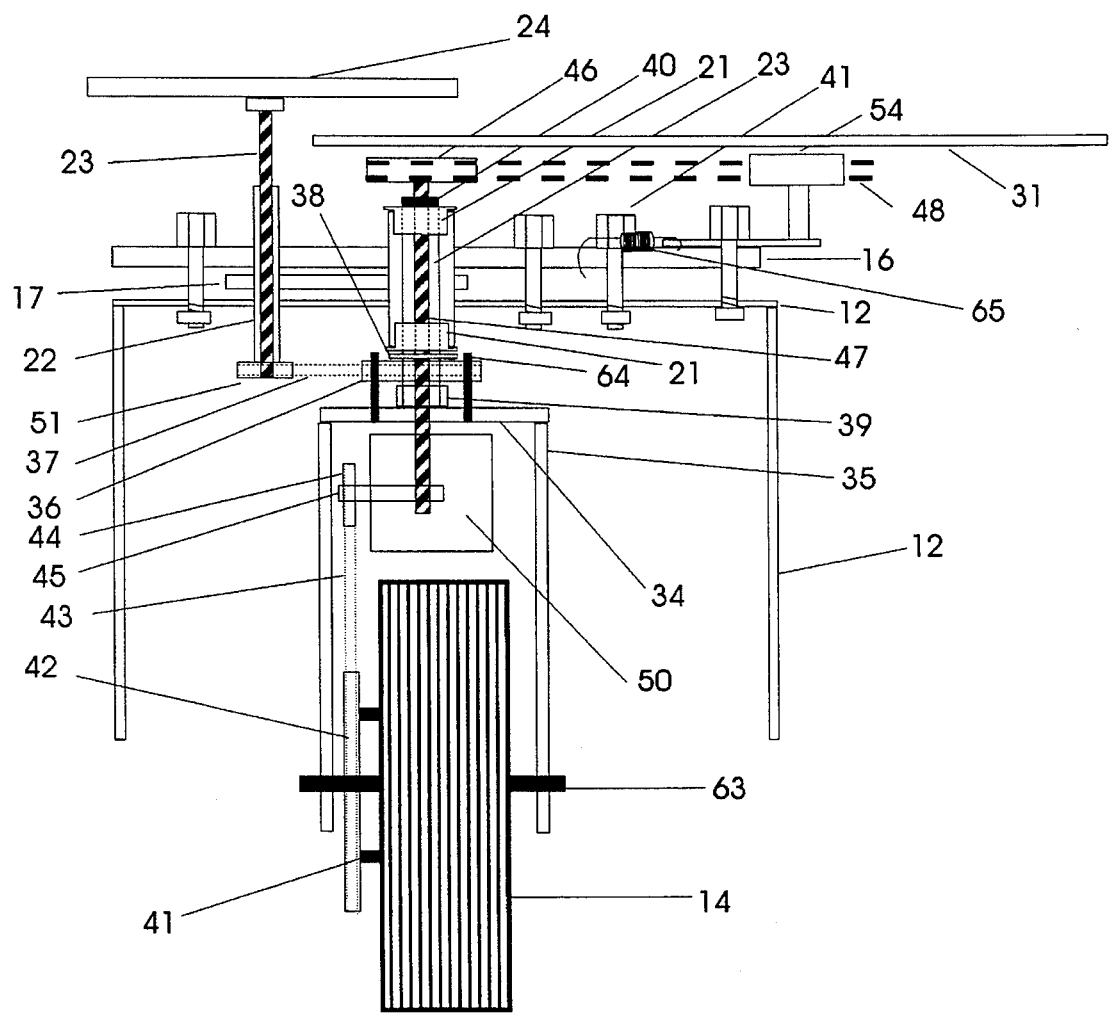
FIG. 3 is a cross sectional view of the drive wheel fork in the preferred embodiment.
Figure 4:
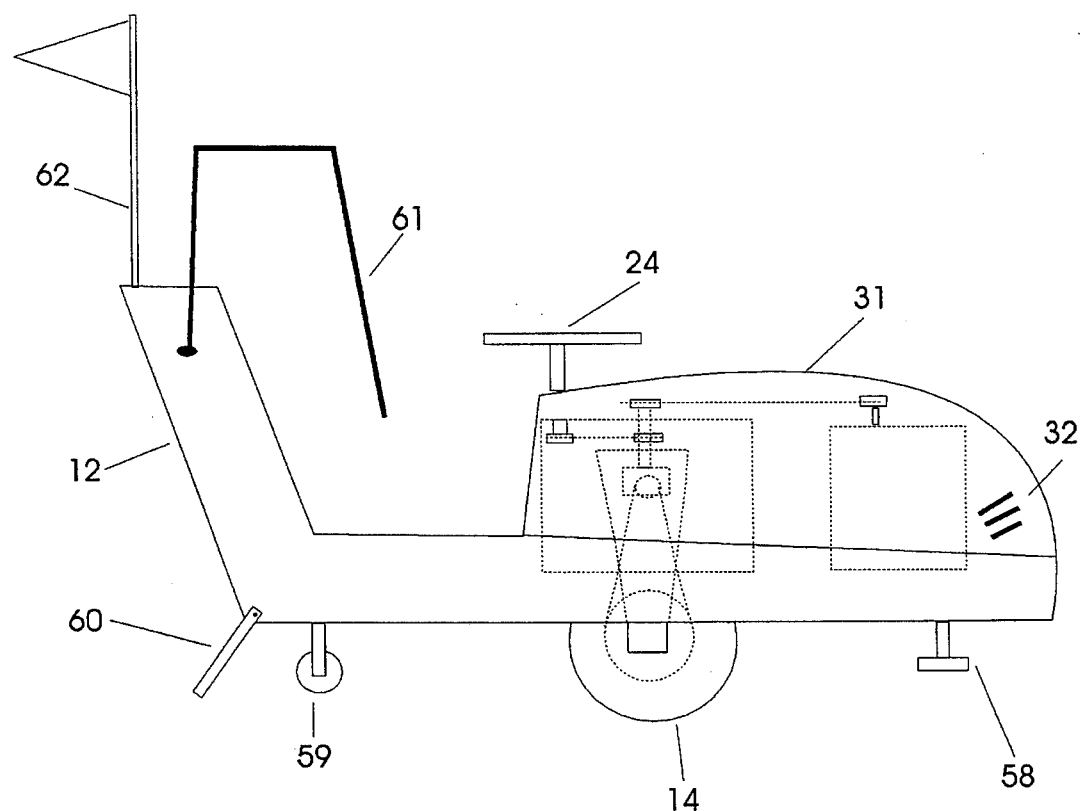
FIG. 4 is a cross sectional view of the independently-powered bumper cart in the preferred embodiment.
Figure 5:
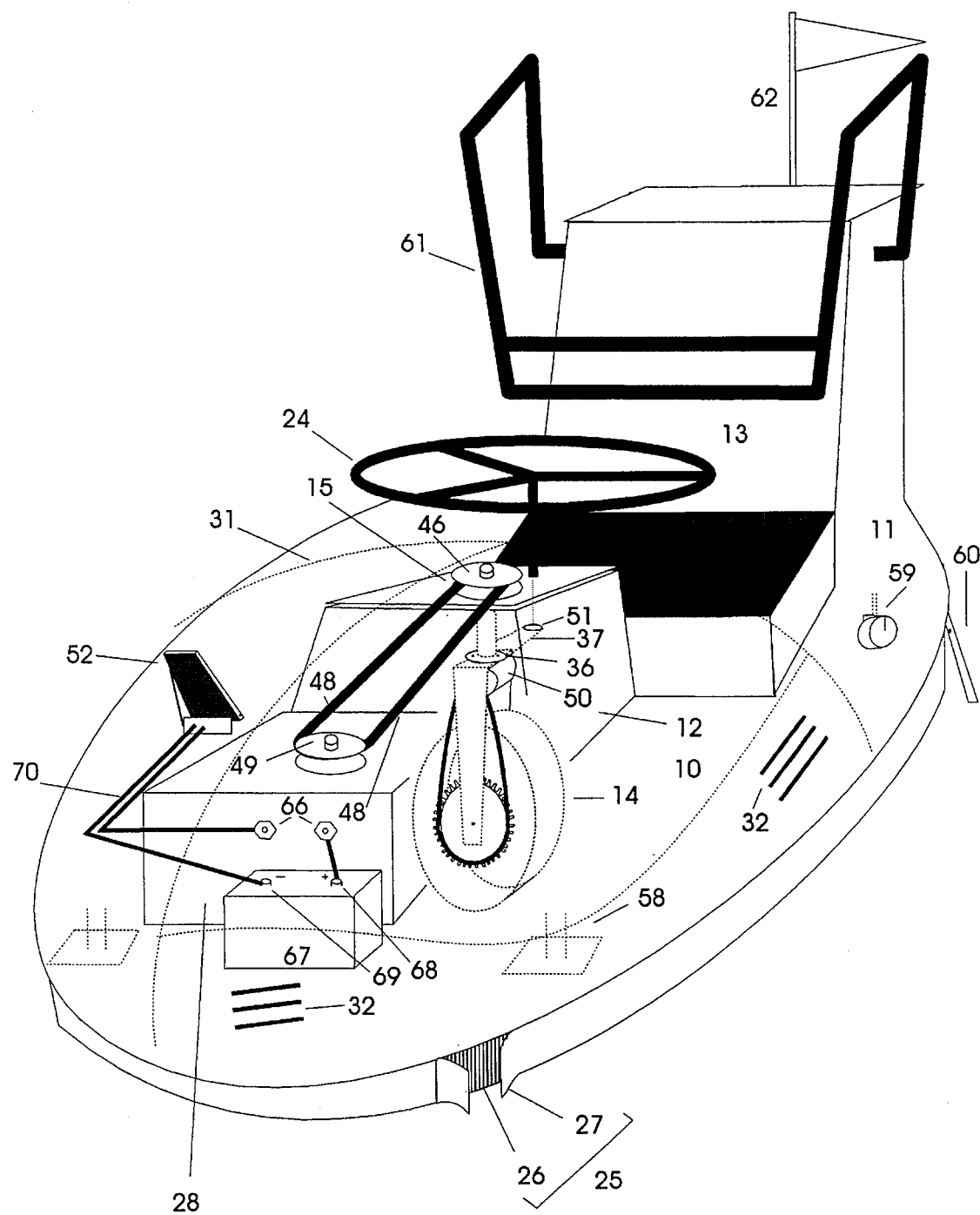
FIG. 5 is a perspective view of an independently-powered bumper cart with an electrical motor.

The parts identified in the drawings include the following:

10 Platform;
11 Chassis;
12 Wheel well;
13 Seat;
14 Traction wheel;
15 Wheel well support platform;
16 Large plate;
17 Small plate;
18 Hole;
19 Drive wheel shaft channel;
20 Drive wheel shaft;
21 Bushings;
22 Steering wheel shaft channel;
23 Steering wheel shaft;
24 Steering wheel;
25 Bumper element;
26 Foam rubber;
27 Conveyor belt material;
28 Motor;
29 Fuel tank;
30 Fuel line
31 Cover;
32 Ventilation holes;
33 Drive wheel fork;
34 Shoulder plate;
35 Prongs;
36 Drive wheel steering sprocket;
37 Steering chain;
38 Washer;
39 Spacer ring;
40 Bearing;
41 Bolts;
42 Lower drive chain sprocket;
43 Drive chain;
44 Upper drive chain sprocket;
45 Short shaft;
46 Pulley;
47 Long shaft;
48 Drive belt;
49 Pulley;
50 Transmission;
51 Steering wheel sprocket;
52 Control device;
53 Idler pulley cable;
54 Idler pulley;
55 Throttle cable;
56 Throttle control;
57 Exhaust pipe;
58 Support plate;
59 Support castor;
60 Stand;
61 Safety restraint;
62 Flag;
63 Axle;
64 Keeper pins;
65 Spring;

DETAILED DESCRIPTION/DESCRIPTION OF THE PREFERRED EMBODIMENT

The present invention provides a highly maneuverable bumper cart that requires no special electrically-conductive surface for operation. Although go-carts have operated on asphalt or concrete surfaces, bumper carts have largely been limited to facilities with special flooring and ceilings to provide conductors for the electrical current used to power the vehicles.

The preferred embodiment of the invention uses an integrated platform (10) and chassis (11) of molded fiberglass. Another embodiment uses a chassis of steel tubing mounted to a platform of plywood.

The fiberglass chassis is oval in shape and has a molded wheel well (12) extending up from the bottom of the chassis (11) and a seat (13) at one end. The wheel well must be large enough to allow for the free rotation of the traction wheel (14) as it is steered in different directions. The center of the top of the wheel well is positioned about six inches from the center of the platform (10) toward the end of the platform away from the seat. A wheel well support platform (15) is attached by bolts (41) above the wheel well to distribute the load on the fiberglass. The wheel well support platform is made of a ¼-inch steel plate (16) about 12 inches long and tapering from about 10 inches on one end to about four inches on the other, welded to a second ¼-inch steel plate (17) about 2½ inches ×7 inches. The wheel well support platform has a 1¾-inch hole (18) located approximately in the middle with a 1¾-inch O.D. (1⅜-inch I.D.) by 3½-inch steel pipe welded into the hole to form a drive wheel shaft channel (19) that holds a 1¼-inch O.D. (1⅛-inch I.D) steel pipe that forms the drive wheel shaft (20). The drive wheel shaft channel (19) has 1⅜-inch O.D. (1¼-inch I.D.; 1¾-inch diameter lip) bushings (21) in the top and bottom to reduce the diameter of the hole to center the drive wheel shaft (20) and allow for free rotation. The wheel well support platform (15) also has a ¾-inch hole with a ¾-inch O.D. (½-inch I.D.) by 8¾-inch steel pipe inserted and welded into place to form a steering wheel shaft channel (22) for the ½-inch diameter by 9¾ inch steering wheel shaft (23). The steering wheel shaft channel (22) also holds the steering wheel (24) in place.

The platform of the chassis is surrounded by a bumper element (25) filled with foam rubber or other shock-absorbing material. The preferred embodiment of the bumper uses 4-inch thick×5-inch wide foam rubber (26) with a compression coefficient of about 40 lbs. per square inch sandwiched between the fiberglass body and a ¼-inch thick×4-inch wide piece of conveyor belt material (27). The surrounding bumper may also be formed from another resilient, shock-absorbing material such as solid rubber, pneumatic or fluid-filled tubes of rubber, plastic or piston-type shock absorbers or springs. The bumper may also be formed from automobile tires that have been sectioned into arcs formed from one-third or one-sixth sections of automobile tires. The pieces of automobile tires may also be filled with foam rubber or other resilient shock-absorbing material. The bumper may also include a metal strike plate instead of the conveyer belt material surrounding the resilient, shock-absorbing material.

The seat (13) may be molded from the fiberglass chassis or mounted to the back of the chassis. The seat is preferably high enough to provide neck and head support to prevent the rider's head from being jerked back when the vehicle is struck from the rear.

The motor (28) for the cart may be a battery-powered electrical motor or a combustion-type engine. The preferred embodiment uses a six-horsepower, air-cooled gasoline engine with a fuel tank (29) with a fuel line (30) leading to motor. The motor should have a drive shaft located on the top.

The motor of the cart will be enclosed for aesthetic purposes with a cover (31) of fiberglass, cloth, plastic or thin metal. The preferred embodiment uses a fiberglass cover attached to the fiberglass chassis (11) and has ventilation holes (32). An alternate embodiment uses a cloth cover stretched over the cover supports and secured by rope laced through metal grommets.

The drive wheel fork is preferably made of ¼-inch thick steel shoulder plate (34) measuring about four by five inches with two prongs of ¼-inch steel about 12 inches long with right angle bends to allow connection by bolts (41) to the shoulder plate (34) with a 1¼-inch O.D. pipe welded to the top to form the drive wheel shaft (20) attached to the shoulder plate (36) of the drive wheel fork. The drive wheel fork (33) holds the traction wheel (14), preferably about 11 inches in diameter, between the two prongs (35) extending from the shoulder plate (34) on one end. The drive wheel shaft (20) extends though the center of a 3½-inch drive wheel steering sprocket (38) rigidly attached by keeper pins (64) to the shoulder plate (34). A spacer ring (39) allows the steering chain (37) to clear the shoulder plate (34) without rubbing. A washer (38) rests on the drive wheel steering sprocket (36) to space it from the lower bushing (21) and the drive wheel shaft channel (19). A bearing (40) is affixed inside the hollow drive wheel shaft (20).

The drive wheel fork, transmission, and the various drive sprockets, bushings, channels and bearing are commercially available as an assembly for use in lawn mowers from Swisher Mower and Machine Co., Warrensburg, Mo.

The traction wheel (14) is mounted on a bolt serving as an axle (63) between the prongs of the drive wheel fork. The traction wheel is rigidly mounted by bolts (41) to a concentrically positioned seven-inch lower drive chain sprocket (42) that engages the drive chain (43). The drive chain (43) is engaged and rotated by a three-inch upper drive chain sprocket (44) attached to the short shaft (45) of a 1:1 right angle transmission element (50) with a four-inch pulley (46) on the long shaft (47). The four-inch pulley is engaged by a drive belt (48) surrounding a two-inch pulley (49) on the drive shaft of the motor (28). The long shaft (47) of the transmission element should be approximately ½-inch in diameter and about 5½ inches long so that it can extend up through the drive wheel shaft channel (19) and the bearing (40) in the wheel well support platform (15). The shod shaft (45) of the transmission element should be ½-inch in diameter and about one-inch long.

The steering wheel (24) causes the drive wheel fork to turn in the desired direction of travel and may be turned 360° or more in either direction. The steering wheel shaft (23) is rigidly attached to a 1⅞-inch steering wheel sprocket (51) that engages a steering chain (37) that engages the 3½-inch drive wheel steering sprocket (36) rigidly attached to the shoulder plate (34) of the drive wheel fork (33). Alternatively, the steering mechanism may include direct cog wheel links between the steering wheel sprocket and the drive wheel steering sprockets (36).

The speed of the motor and the vehicle is regulated by a control device (52), preferably a foot pedal, attached to an idler pulley cable (53) that controls a idler pulley (54) attached to the wheel well support platform (15) that adjusts the tension on the drive belt (48) and a throttle cable (55) attached to the throttle control (56) of the motor. The idler pulley is pulled away from the belt by a spring (65) to slacken the belt when pressure is removed from the control device. An exhaust pipe (57) directs the exhaust fumes away from the driver. The control device (52) for an electric motor may include a switch or similar device connected in a circuit formed by a wire (70) attached to one terminal (66) of the motor (28) and the positive electrode (68) of a battery (67) and another wire attached to a second terminal (66) and the battery's negative electrode (69).

The chassis platform is supported off the ground by support such as support plates (58), castors (59) or both. Preferably, two castors are used at the rear of the vehicle to allow the cart to spin freely. The weight of the motor tends to tip the front of the vehicle down when no rider is present and support plates on the front instead of castors help to keep the vehicle from rolling. The preferred clearance between the chassis platform and the ground is about two inches. A support stand (60) keeps the vehicle from rolling when it is not being driven.

A rider safety restraint (61) is used to keep the from being thrown from the seat. The restraint may be in the form of a restraint bar, seat belt, shoulder straps or a combination of these devices.

The invention may include a signaling device to indicate when the vehicle has been hit by another vehicle such as an electrical signal or a flag (62) triggered to lower upon impact.

What is claimed is:

1. A bumper cart, comprising:

a chassis comprising a top and a bottom, a right side, a left side, a front and a back, a centrally-located first hole through the top and the bottom and a second hole through the top and the bottom;

a platform attached to the chassis with a first hole aligned with the first hole of the chassis and a second hole aligned with the second hole in the chassis;

a bumper element surrounding the front, the back, the right side and the left side of the chassis;

a seat on the top of the chassis at the back;

a motor having a rotating shaft and a throttle with said motor affixed to the top of the chassis, a first pulley affixed to the rotating shaft and the throttle connected to a control device;

a drive wheel fork having a shoulder plate with a hole and two opposing prongs on one end and a hollow shaft aligned with the hole on an opposing end, with each prong having an axle hole near the end of the prong so that the axle holes are aligned equidistant from the ends of the prongs;

the hollow shaft of the drive wheel fork having a top at the opposing end of the drive wheel fork from the prongs, and extending through a center of a rigidly attached drive wheel steering sprocket rigidly attached to the shoulder plate up through a drive wheel shaft channel positioned in the first hole in the chassis and through the first hole of the platform and affixed to said platform, and further extending through a plurality of bushings to keep said hollow shaft centered in said drive wheel shaft channel;

a traction wheel and a concentrically-mounted lower drive chain sprocket rigidly attached to an axle extending through the axle holes in the two prongs of the drive wheel fork and rotatable in a plane between the opposing prongs of the drive wheel fork;

a transmission element with a first shaft extending up through the hollow shaft of the drive wheel fork, a bearing affixed in the center of the top of the hollow shaft of the drive wheel fork and a rigidly attached second pulley and with a second shaft extending through a rigidly attached upper drive chain sprocket;

a drive belt surrounding the first pulley and the second pulley;

a steering wheel attached at the center to a steering shaft extending perpendicularly from the rotational plane of the steering wheel and with the steering shaft extending through a steering wheel shaft channel extending through the second hole of the chassis and rigidly attached inside the second hole of the platform, and through an attached steering wheel sprocket;

a steering chain engaging the steering wheel sprocket and the drive wheel steering sprocket attached to the hollow shaft of the drive wheel fork;

a safety restraint; and a plurality of supports.

2. A bumper cart according to claim 1, comprising a chassis of molded polymer resin.

3. A bumper cart according to claim 2, comprising a cover attached to the top and sides of the chassis and extending above the motor.

4. A bumper cart according to claim 2, comprising a motor consisting of a gasoline engine; further comprising a fuel tank, a fuel line attached to the gasoline engine and the fuel tank and an exhaust pipe, and having the drive belt subject to tensioning by an idler pulley attached by an idler pulley cable to the control device with said idler pulley retracted from the drive belt when the pressure from the idler pulley cable is released.

5. A bumper cart according to claim 2, comprising an electrical motor with two terminals and further comprising a battery with a positive electrode and a negative electrode, an electrical circuit formed by a plurality of wires connecting one of the terminals of the electrical motor with the positive electrode of the battery and the other terminal with the negative electrode.

6. A bumper cart according to claim 2, comprising a control device attached to the electrical circuit.

7. A bumper cart, comprising:

a molded chassis having a top and a bottom, a right side, a left side, a front and a back, a wheel well in the molded chassis, a centrally-located first hole through the wheel well and a second hole through the wheel well toward the back from the first hole;

a platform attached to the top of the chassis above the wheel well with a first hole aligned with the first hole of the chassis and a second hole aligned with the second hold in the chassis;

a bumper element surrounding the front, the back, the right side and the left side of the chassis;

a seat on the top of the chassis at the back;

a motor having a rotating shaft with said motor affixed to the top of the chassis, a first pulley affixed to the rotating shaft and a means for controlling the motor;

a drive wheel fork having a shoulder plate having a hole through said shoulder plate from a top side to a bottom side and two rigidly attached parallel prongs perpendicular to said bottom side of said shoulder plate with each prong having an axle hole near the end of the prong so that the axle holes are aligned equidistant from the ends of the prongs, and said shoulder plate having a hollow shaft aligned with said hole and rigidly attached perpendicular to the top side of said shoulder plate;

the hollow shaft of the drive wheel fork having a top at the end of the drive wheel fork opposing the end of the prongs, extending through a center of a rigidly attached drive wheel steering sprocket, a channel positioned through the first hole in the wheel well of the chassis and the first hole of the platform, and a plurality of bushings centered in the channel;

a traction wheel and a concentrically-mounted lower drive chain sprocket rigidly attached to an axle extending through the axle holes in the two prongs of the drive wheel fork and rotatable in a plane between the opposing prongs of the drive wheel fork;

a transmission element with a first shaft extending up through the hollow shaft of the drive wheel fork, a bearing centered and affixed in the top of the hollow shaft of the drive wheel fork and a rigidly attached second pulley and with a second shaft extending through a rigidly attached upper drive chain sprocket;

a drive belt surrounding the first pulley and the second pulley;

a means for steering said drive wheel fork;

a safety restraint; and a plurality of supports.

* * * * *